United States Patent
Mizuno et al.

(10) Patent No.: US 10,030,093 B2
(45) Date of Patent: Jul. 24, 2018

(54) CELLULOSE NANOFIBER POWDER AND METHOD FOR PRODUCING THE SAME

(71) Applicants: Toyota Shatai Kabushiki Kaisha, Kariya-shi, Aichi (JP); Kurashiki Boseki Kabushiki Kaisha, Kurashiki-shi, Okayama (JP)

(72) Inventors: Asuka Mizuno, Aichi (JP); Minoru Sugiyama, Osaka (JP)

(73) Assignees: Toyota Shatai Kabushiki Kaisha, Aichi (JP); Kurashiki Boseki Kabushiki Kaisha, Okayama (JP)

( * ) Notice: Subject to any disclaimer, the term of this patent is extended or adjusted under 35 U.S.C. 154(b) by 0 days.

(21) Appl. No.: 15/463,484

(22) Filed: Mar. 20, 2017

(65) Prior Publication Data

US 2017/0283538 A1    Oct. 5, 2017

(30) Foreign Application Priority Data

Mar. 29, 2016 (JP) .................... 2016-065442

(51) Int. Cl.
*C08G 63/48* (2006.01)
*C08G 18/38* (2006.01)
(Continued)

(52) U.S. Cl.
CPC .............. *C08F 251/02* (2013.01); *B29B 9/16* (2013.01); *C08J 3/28* (2013.01); *C08J 2351/02* (2013.01)

(58) Field of Classification Search
CPC ........ C08F 251/02; C08J 3/28; C08J 2351/02; B29B 9/16
(Continued)

(56) References Cited

U.S. PATENT DOCUMENTS

2014/0073722 A1    3/2014    Shiramizu et al.
2016/0133902 A1    5/2016    Nakamura et al.
(Continued)

FOREIGN PATENT DOCUMENTS

EP    2 824 115        1/2015
JP    2009-256832    11/2009
(Continued)

OTHER PUBLICATIONS

Extended European Search Report issued in corresponding European application No. 17162136.0, dated Sep. 6, 2017, 5 pages.

*Primary Examiner* — William K Cheung
(74) *Attorney, Agent, or Firm* — Hamre, Schumann, Mueller & Larson, P.C.

(57) ABSTRACT

A cellulose nanofiber (CNF) powder of the present invention contains cellulose nanofibers, and a hydrophobic polymer that is chemically bonded to at least some of the —OH groups of the cellulose nanofibers. The CNF powder has the ability to be dispersed in water and to return to a powder form again when an aqueous dispersion of the CNF powder is dried. The distance between the fibers in the CNF powder in a dry state is 3 nm or more, and preferably 8 to 12 nm. Since the distance between the fibers in the conventional cellulose nanofibers is about 1 nm, the present invention reduces the Van der Waals force between the fibers (i.e., the force of attraction between the fibers) to one millionth of that of the conventional cellulose nanofibers. Thus, the present invention provides the CNF powder that can be used in a powder form, and that can also be reversibly changed between a powder state and a dispersed state in water, and a method for producing the CNF powder.

8 Claims, 5 Drawing Sheets

(51) Int. Cl.
    *C08F 251/02*     (2006.01)
    *C08J 3/28*     (2006.01)
    *B29B 9/16*     (2006.01)

(58) Field of Classification Search
    USPC .............................................. 525/10; 524/35
    See application file for complete search history.

(56) References Cited

U.S. PATENT DOCUMENTS

2016/0263554 A1*   9/2016   Grubbs .................. B01J 20/265
2016/0333116 A1   11/2016   Nakatani et al.

FOREIGN PATENT DOCUMENTS

| | | |
|---|---|---|
| JP | 2010-216021 | 9/2010 |
| JP | 2014-234472 | 12/2014 |

\* cited by examiner

CELLULOSE NANOFIBER POWDER AND METHOD FOR PRODUCING THE SAME

BACKGROUND OF THE INVENTION

1. Field of the Invention

The present invention relates to a cellulose nanofiber powder to which a hydrophobic polymer is bonded, and a method for producing the cellulose nanofiber powder.

2. Description of Related Art

Cellulose nanofibers are conventionally known and can be produced in the following manner. A cellulose material is dispersed in water or the like, and then the dispersion is exposed to high shear forces so that the cellulose fibers are fibrillated. The high shear forces may be applied by, e.g., a bead mill, a blender-type disperser, a high-speed rotating homogenizer, a high-pressure homogenizer, a high-pressure injection treatment, or an ultrasonic disperser. For example, Patent Document 1 proposes to produce cellulose nanofibers using a material containing lignin. Patent Document 2 proposes to produce cellulose nanofibers by treating cellulose in the form of powder particles with a dibasic acid anhydride, dispersing the cellulose in the form of powder particles into a plasticizer, and melt-kneading the dispersion and polyolefin. Patent Document 3 proposes to produce cellulose nanofibers in water.

PRIOR ART DOCUMENTS

Patent Documents

Patent Document 1: JP 2010-216021
Patent Document 2: JP 2014-234472
Patent Document 3: JP 2009-256832

SUMMARY OF THE INVENTION

The cellulose nanofibers produced by the above conventional technologies are dispersed in a solvent, typically in water, to form a dilute aqueous dispersion when they are stored, transported, and used. This is because the cellulose nanofibers have a molecular structure including many hydroxyl groups (—OH groups), and also have a small fiber diameter. Therefore, once the cellulose nanofibers are dried, they are aggregated together by hydrogen bonds between the hydroxyl groups, and cannot be restored to their original state. These are problems associated with the conventional technologies.

In order to solve the conventional problems, it is an object of the present invention to provide a cellulose nanofiber powder that can be used in a powder form, and that can also be reversibly changed between a powder state and a dispersed state in water, and a method for producing the cellulose nanofiber powder.

A cellulose nanofiber powder of the present invention contains cellulose nanofibers, and a hydrophobic polymer that is chemically bonded to at least some of the —OH groups of the cellulose nanofibers. The cellulose nanofiber powder has the ability to be dispersed in water and to return to a powder form again when an aqueous dispersion of the cellulose nanofiber powder is dried.

A method for producing a cellulose nanofiber powder of the present invention includes the following: (i) applying raw cellulose nanofibers dispersed in a solvent to the surface of a substrate sheet having wettability with respect to the solvent; (ii) irradiating the substrate sheet coated with the raw cellulose nanofibers with an electron beam when the raw cellulose nanofibers are wet or after the raw cellulose nanofibers are dried, and bringing the raw cellulose nanofibers into contact with a solution or dispersion containing a hydrophobic monomer so that the hydrophobic monomer is graft-polymerized onto the raw cellulose nanofibers, or mixing the raw cellulose nanofibers dispersed in the solvent with a hydrophobic monomer, applying the mixture to the surface of the substrate sheet, and irradiating the substrate sheet coated with the mixture with an electron beam so that the hydrophobic monomer is graft-polymerized onto the raw cellulose nanofibers; (iii) removing a graft-polymerized coating from the substrate sheet as a recovered material; (iv) washing an unreacted material from the recovered material; and (v) drying the recovered material.

In the cellulose nanofiber powder of the present invention, the hydrophobic polymer blocks at least some of the —OH groups of the cellulose nanofibers, and thus prevents the hydrogen bonds between the cellulose fibers. This imparts to the cellulose nanofiber powder the ability to be dispersed in water and to return to a powder form again when an aqueous dispersion of the cellulose nanofiber powder is dried. Consequently, the cellulose nanofiber powder can be used in a powder form and can also be reversibly changed between a powder state and a dispersed state in water. Moreover, the cellulose nanofiber powder can have a high affinity for a matrix resin by selecting an appropriate hydrophobic polymer.

DETAILED DESCRIPTION OF THE INVENTION

Figure 1:
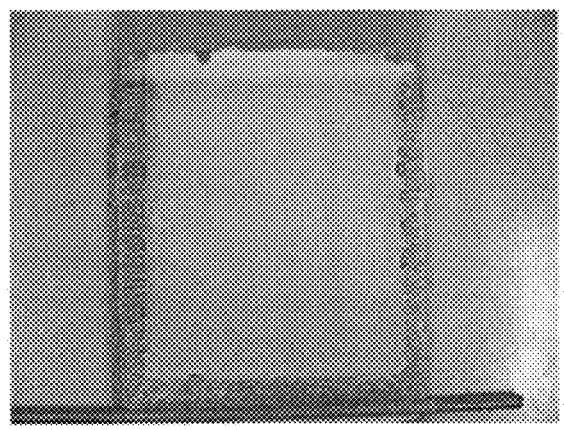
FIG. 1 is a photograph showing a state in which raw cellulose nanofibers dispersed in water are applied to the surface of a substrate sheet in an example of the present invention.

Cellulose nanofibers are not particularly limited, and may be preferably microfibrillated cellulose that is obtained by fibrillating the pulp of plants or the like at the nano level by a mechanical treatment such as a high-pressure homogenizer, a biaxial kneader, a crusher, or ultrasonic waves. The fiber diameter of the cellulose nanofibers is preferably, e.g., 4 to 100 nm, and more preferably 10 to 50 nm. The fiber length of the cellulose nanofibers is preferably, e.g., 1 to 10 μm, and more preferably about 2 to 9 μm.

In the cellulose nanofiber powder, a hydrophobic polymer is chemically bonded to at least some of the —OH groups of the cellulose nanofibers. Monomers that are capable of forming the hydrophobic polymer are not particularly limited. Examples of the monomers include the following:

(1) unsaturated carboxylic acids and acid anhydrides thereof such as acrylic acid, methacrylic acid, fumaric acid, maleic acid, itaconic acid, maleic anhydride, and itaconic anhydride, and unsaturated carboxylic acid esters such as methyl acrylate, ethyl acrylate, methyl methacrylate, ethyl methacrylate, monomethyl maleate, dimethyl maleate, and butyl benzyl maleate;

(2) vinyl esters such as vinyl acetate, vinyl propionate, and vinyl stearate, and vinyl ethers such as methyl vinyl ether, ethyl vinyl ether, octyl vinyl ether, and lauryl vinyl ether;

(3) vinylidenes such as vinylidene chloride;

(4) aromatic vinyl compounds such as styrene, α-methyl styrene, and divinylbenzene; and (5) unsaturated nitriles such as acrylonitrile, and cross-linkable monomers such as diallyl phthalate.

The cellulose molecule is represented by the following general formula (Chemical Formula 1), where n is an integer of 1 or more (this applies to the other chemical formulas). The cellulose molecule has highly reactive hydroxyl groups at the C-2, C-3, and C-6 positions of the glucose residue. In the present invention, a hydrophobic polymer is covalently bonded to these sites. For example, polymethyl methacrylate is covalently bonded to the C-2 position of the glucose residue by graft polymerization. This example is represented by the following Chemical Formulas 2 and 3, where "Cell" indicates cellulose, and the —CH$_2$— group is a hydrocarbon radical in the cellulose chain, in which polymethyl methacrylate is formed by graft polymerization.

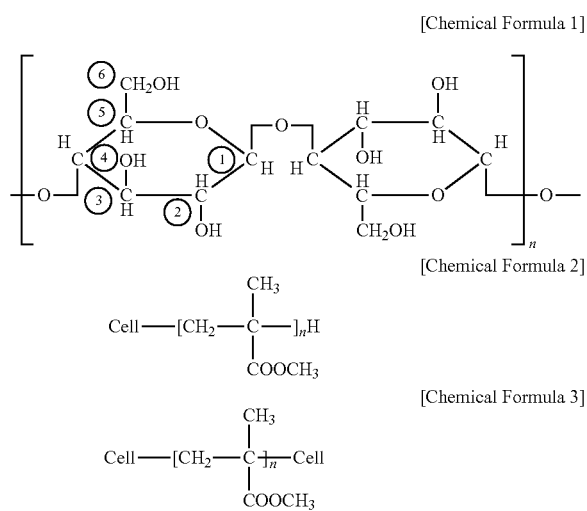

[Chemical Formula 1]

[Chemical Formula 2]

[Chemical Formula 3]

The cellulose nanofiber powder of the present invention is a solid dry powder in general. This powder can be dispersed in a solvent, typically in water. The cellulose nanofiber powder is in the form of a dispersion of the powder and it does not form a gel or a sol when mixed with water. Moreover, an aqueous dispersion of the cellulose nanofiber powder returns to a powder form again when dried. On the other hand, the conventional cellulose nanofibers are available as an aqueous dispersion. If this aqueous dispersion is dried, the cellulose nanofibers are aggregated, and cannot be restored to their original aqueous dispersion.

In the present invention, the distance between the fibers in the cellulose nanofiber powder in a dry state is preferably 3 nm or more, further preferably 5 nm or more, and particularly preferably 8 nm or more. Of course, the most preferred distance between the fibers would be indefinite when the cellulose nanofibers in a dry state are extracted one at a time. In view of this, there may be no point in setting the upper limit to the distance between the fibers. However, the present invention can easily increase the distance between the fibers to about 20 nm. On the other hand, the distance between the fibers in the conventional cellulose nanofibers is assumed to be about 1 nm, and thus the fibers are likely to be aggregated. Such a significant increase in the distance between the fibers from as small as 1 nm to about 10 nm, which is within the range of the present invention, reduces the Van der Waals force between the fibers (i.e., the force of attraction between the fibers) to one millionth of that of the conventional cellulose nanofibers. This is a surprising effect.

It is preferable that the cellulose nanofiber powder does not become viscous when mixed with water. Due to this property the handling of the cellulose nanofiber powder is improved, and the cellulose nanofiber powder easily can be kneaded with a resin or the like.

It is preferable that the hydrophobic polymer is formed by graft polymerization of a hydrophobic monomer including an unsaturated hydrocarbon bond. Any desired hydrophobic monomer can be bound to the cellulose nanofibers by graft polymerization. For example, a hydrophobic monomer having an organic group that has an affinity for a matrix resin can be bound to the cellulose nanofibers.

A method for producing the cellulose nanofiber powder of the present invention includes the following steps of:

A. applying raw cellulose nanofibers dispersed in a solvent to the surface of a substrate sheet having wettability with respect to the solvent;

B. irradiating the substrate sheet coated with the raw cellulose nanofibers with an electron beam when the raw cellulose nanofibers are wet or after the raw cellulose nanofibers are dried, and bringing the raw cellulose nanofibers into contact with a solution or dispersion containing a hydrophobic monomer so that the hydrophobic monomer is graft-polymerized onto the raw cellulose nanofibers, or mixing the raw cellulose nanofibers dispersed in the solvent with a hydrophobic monomer, applying the mixture to the surface of the substrate sheet, and irradiating the substrate sheet coated with the mixture with an electron beam so that the hydrophobic monomer is graft-polymerized onto the raw cellulose nanofibers;

C. removing a graft-polymerized coating from the substrate sheet as a recovered material;

D. washing an unreacted material from the recovered material; and

E. drying the recovered material.

The substrate sheet is not particularly limited, and any substrate sheet having the following properties can be used. In the step A, the substrate sheet has good solvent wettability, typically good water wettability, and is less deformed by heat generated during drying after the application process. In the step B, the substrate sheet itself is not likely to respond to the electron beam irradiation. In the step C, the substrate sheet exhibits releasability. To meet these requirements, the substrate sheet is preferably a polyester film. Examples of the polyester film include a polyethylene terephthalate (PET) film, a polytrimethylene terephthalate (PTT) film, and a polybutylene terephthalate (PBT) film. In particular, the PET film is preferred. The polyester film can have both the water wettability in the application process and the releasability in the recovery process.

In the application process of the step A, it is preferable that the raw cellulose nanofibers dispersed in water are applied so that the thickness of the raw cellulose nanofibers in a wet state is 0.01 to 20 mm. The thickness is more preferably 0.02 to 5 mm. The thickness in this range makes it easy to irradiate the raw cellulose nanofibers with an electron beam, and to bring the raw cellulose nanofibers into contact with an aqueous solution or an aqueous dispersion containing a hydrophobic monomer.

It is preferable that the raw cellulose nanofibers are brought into contact with the solution or dispersion containing a hydrophobic monomer by immersion or spraying. The immersion or spraying is highly efficient. In this case, the solution is generally an aqueous solution, and the dispersion is generally an aqueous dispersion.

It is preferable that an unreacted material is washed from the recovered material by performing a process of mixing the recovered material with water or ethanol and centrifuging the mixture, and repeating the process multiple times. This washing process is highly efficient. If a filter is used, it is difficult to efficiently perform the washing process, since the filter is clogged right away. The centrifugation is performed, e.g., at 4000 rpm for 15 minutes.

In the step B, the coating may be irradiated with an electron beam when it is wet or after it is dried. The electron beam irradiation generates free radicals in the cellulose nanofibers, and thus the hydrophobic monomer is bound to the cellulose nanofibers to form a polymer.

The hydrophobic monomer used in the present invention is bound to some of the —OH groups of cellulose, and can reduce the Van der Waals force due to the hydrogen bonds between the —OH groups of the cellulose. Examples of the hydrophobic monomer include the following: acrylic acid and its salt such as methacrylic acid; acrylic ester and its salt such as methyl methacrylate; a nitrile-based monomer such as acrylonitrile; an amide-based monomer such as acrylamide; and a monomer containing a vinyl group.

The amount of irradiation of the electron beam is generally 1 to 200 kGy, preferably 5 to 100 kGy, and more preferably 10 to 50 kGy. It is preferable that the electron beam irradiation is performed in a nitrogen atmosphere. Because of the penetrability of the electron beam, only one side of the coating of the raw cellulose nanofibers on the substrate sheet needs to be irradiated with the electron beam. The electron beam irradiation apparatus can be any commercially available apparatus, including, e.g., an area beam type electron beam irradiation apparatus such as EC250/15/180L (manufactured by IWASAKI ELECTRIC CO., LTD), EC300/165/800 (manufactured by IWASAKI ELECTRIC CO., LTD.), or EPS300 (manufactured by NHV Corporation).

After the hydrophobic monomer is graft-polymerized by the electron beam irradiation, an unreacted component is removed by washing with water, and then the resulting material is dried. In this case, the drying may be performed by e.g., a dryer at 100 to 120° C. for 0.5 to 3 hours.

EXAMPLES

The present invention will be described in more detail by way of examples. However, the present invention is not limited to the following examples.

<Weight Graft Ratio>

The graft ratio of a hydrophobic polymer to raw cellulose nanofibers (CNF) is calculated by the following formula.

Graft ratio=[(CNF weight after EB processing−CNF weight before EP processing)/(CNF weight before EB processing)]×100

The EB (electron beam) processing allows a hydrophobic monomer to be graft-polymerized onto the cellulose nanofibers by electron beam irradiation.

<Absorbance>

Infrared (IR) spectroscopic analysis was carried out to measure a peak derived from the ester group in the range of 1720 to 1730 cm$^{-1}$ of the infrared absorption spectrum.

Example 1

As raw cellulose nanofibers (CNF), "ARBOCEL" (trade name: 7 wt % CNF aqueous dispersion) manufactured by Rettenmaier was used, and 0.55 g of CNF was sampled. The CNF aqueous dispersion was spread on a polyethylene terephthalate (PET) film having a length of 15 mm, a width of 20 mm, and a thickness of 75 μm. The thickness of the CNF coating was about 2.6 mm. This state is shown in FIG. 1.

Figure 2:
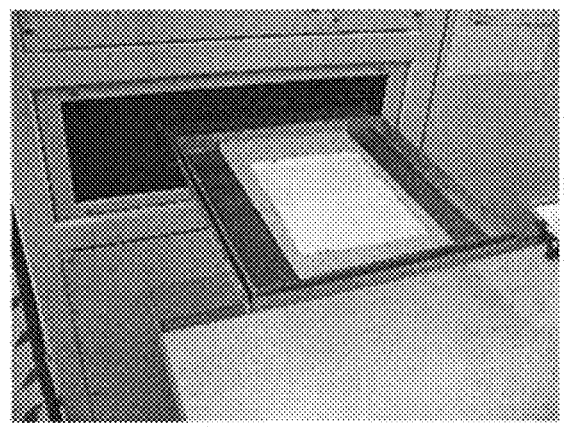
FIG. 2 is a photograph showing a state in which the substrate sheet coated with the raw cellulose nanofibers is being inserted into an electron beam irradiation apparatus.

The CNF coating was dried at 110° C. for 2 hours, and then was placed in an electron beam irradiation apparatus. The CNF coating was irradiated with an electron beam under the conditions that the temperature was 25° C., the voltage was 250 kV, and the amount of irradiation was 40 kGy. The electron beam irradiation was performed at vapor pressure. FIG. 2 shows a state in which the CNF coating on the PET film is being inserted into the electron beam irradiation apparatus.

Figure 3:
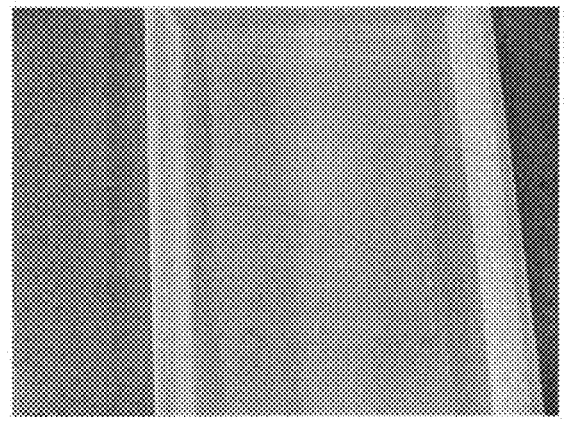
FIG. 3 is a photograph showing a state in which the raw cellulose nanofibers irradiated with an electron beam is immersed in an aqueous solution or aqueous dispersion containing a hydrophobic monomer so that the hydrophobic monomer is graft-polymerized onto the raw cellulose nanofibers.

Then, the CNF coating was taken out of the electron beam irradiation apparatus, and immediately immersed, together with the PET film, in 250 g of a processing liquid containing 10 wt % of methyl methacrylate (MMA) (hydrophobic monomer), 0.5 wt % of polyoxyethylene sorbitan monolaurate (surface active agent), and water. The CNF coating was allowed to react at a room temperature of 25° C. for 10 minutes. FIG. 3 shows a state in which the CNF coating is immersed in an aqueous solution or aqueous dispersion containing the hydrophobic monomer so that the hydrophobic monomer is graft-polymerized onto the cellulose nanofibers. As shown in FIG. 3, the rectangular sample was put in the liquid in a white tray.

Figure 4:
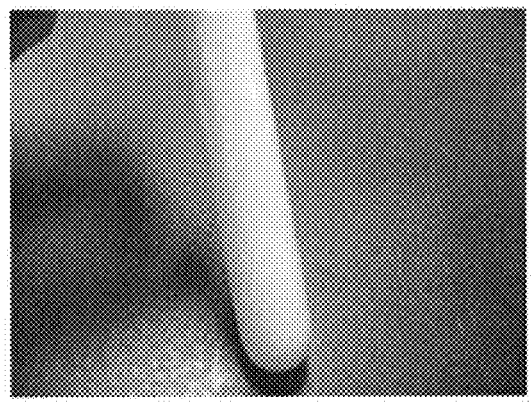
FIG. 4 is a photograph showing a state in which the graft-polymerized cellulose nanofibers are removed from the substrate sheet, placed in a test tube, and shaken after the addition of water.
Figure 5:
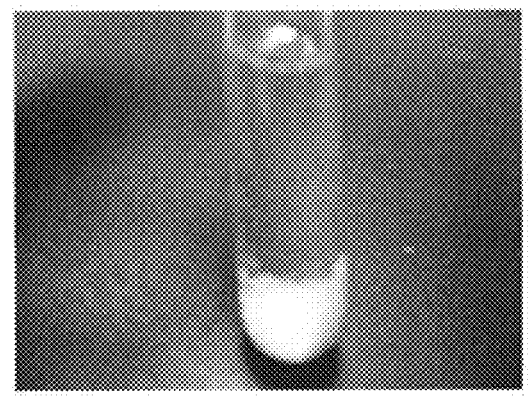
FIG. 5 is a photograph showing a cellulose nanofiber powder after centrifugation.

Next, the CNF coating was removed from the PET film, placed in a test tube, and washed. In the washing process, 50 ml of water was added to the test tube, and the mixture was shaken, followed by centrifugation at 4000 rpm for 15 minutes. Then, the supernatant liquid was discarded. The washing process was repeated 5 times. Consequently, an unreacted material of the hydrophobic monomer and the surface active agent were removed. FIG. 4 shows a state in which the CNF coating is removed from the substrate sheet, placed in the test tube, and shaken after the addition of water. FIG. 5 shows a CNF powder after centrifugation.

Figure 6:
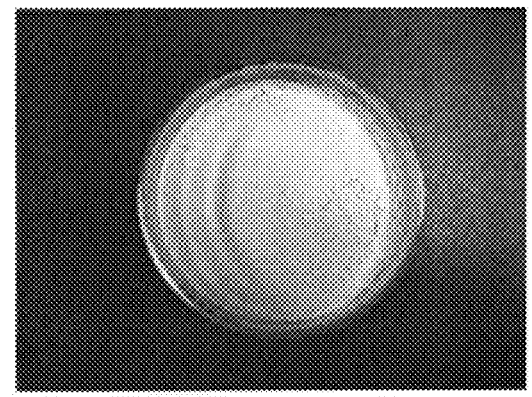
FIG. 6 is a photograph showing the cellulose nanofiber powder after drying.

Subsequently, the CNF powder was placed in a dryer and dried at 110° C. for 2 hours. FIG. 6 shows the CNF powder after drying. The resulting CNF powder was dry and smooth, did not become viscous when mixed with water, and returned to its original powder form when dried. Therefore, the CNF powder had good handling properties. Table 1 shows the weight graft ratio of the methyl methacrylate (MMA) and the IR absorbance.

Example 2

Example 2 was performed in the same manner as Example 1 except that the CNF coating on the PET film was wet while it was placed in the electron beam irradiation apparatus and irradiated with an electron beam. When the CNF powder thus obtained was in a stationary state, the apparent density of the CNF powder was the same as that of the CNF powder in Example 1. This CNF powder was dry and smooth, did not become viscous when mixed with water, and returned to its original powder form when dried. Therefore, the CNF powder had good handling properties. Table 1 shows the weight graft ratio of the methyl methacrylate (MMA) and the IR absorbance.

TABLE 1

|  | Monomer | State of CNF during EB irradiation | Weight graft ratio (wt %) | Absorbance ($\times 10^{-3}$) |
|---|---|---|---|---|
| Example 1 | MMA | DRY | 368 | 0.021 |
| Example 2 | MMA | WET | — | 0.001 |

Figure 7:
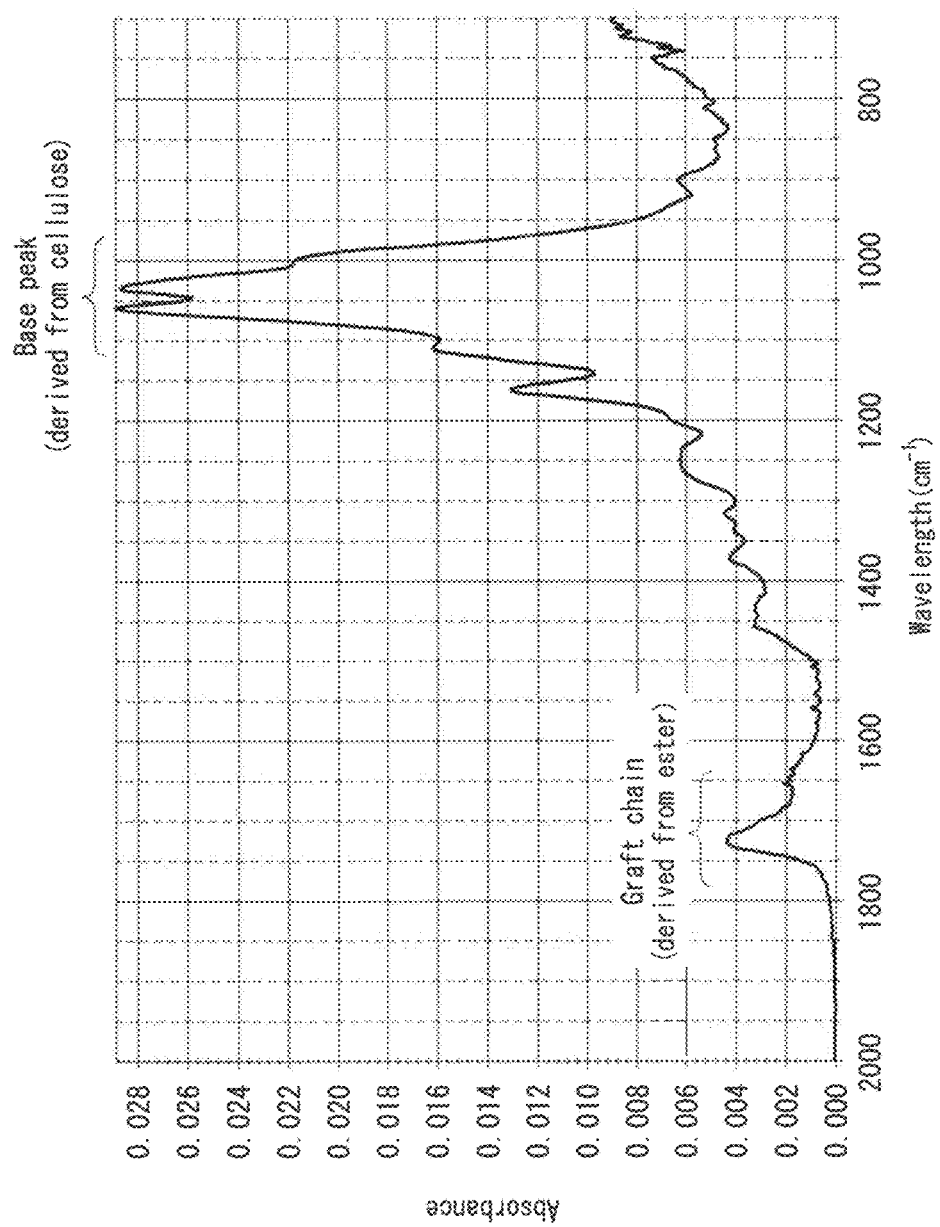
FIG. 7 is an infrared absorption spectrum of the cellulose nanofiber powder.

As is evident from Table 1, when the cellulose nanofibers were dried during the electron beam irradiation, the graft polymerization of MMA was confirmed by both the weight graft ratio and the IR absorbance. When the cellulose nanofibers were wet during the electron beam irradiation, the graft polymerization of MMA was confirmed by the IR absorbance. FIG. 7 shows an example of the typical waveform of the infrared absorption spectrum of the CNF powder. The analysis confirmed the graft polymerization, since there was a peak derived from the ester group in the range of 1720 to 1730 $cm^{-1}$ of the infrared absorption spectrum.

Figure 8:
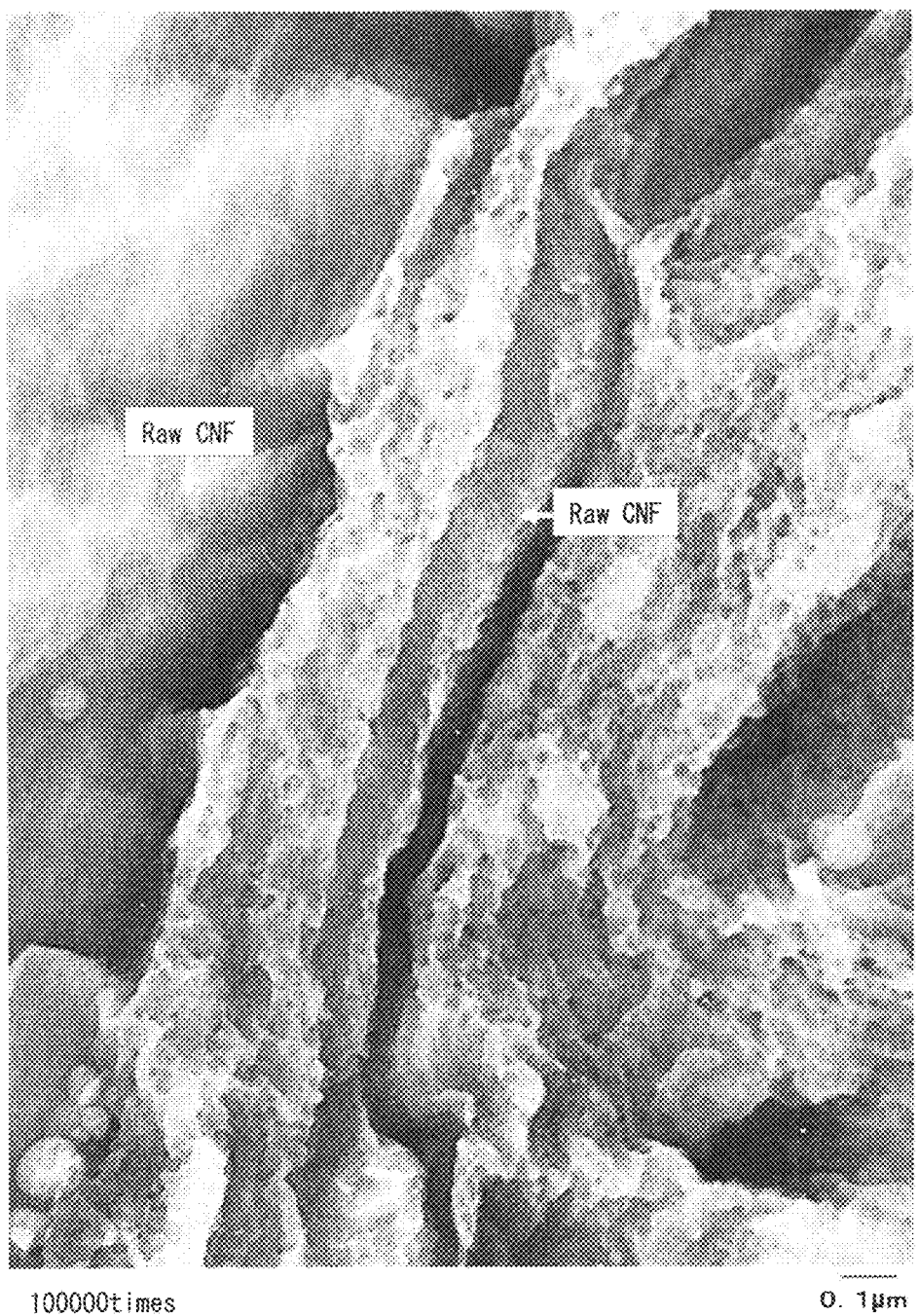
FIG. 8 is a transmission electron micrograph (TEM) showing the distance between the fibers in the cellulose nanofibers before the treatment.
Figure 9:
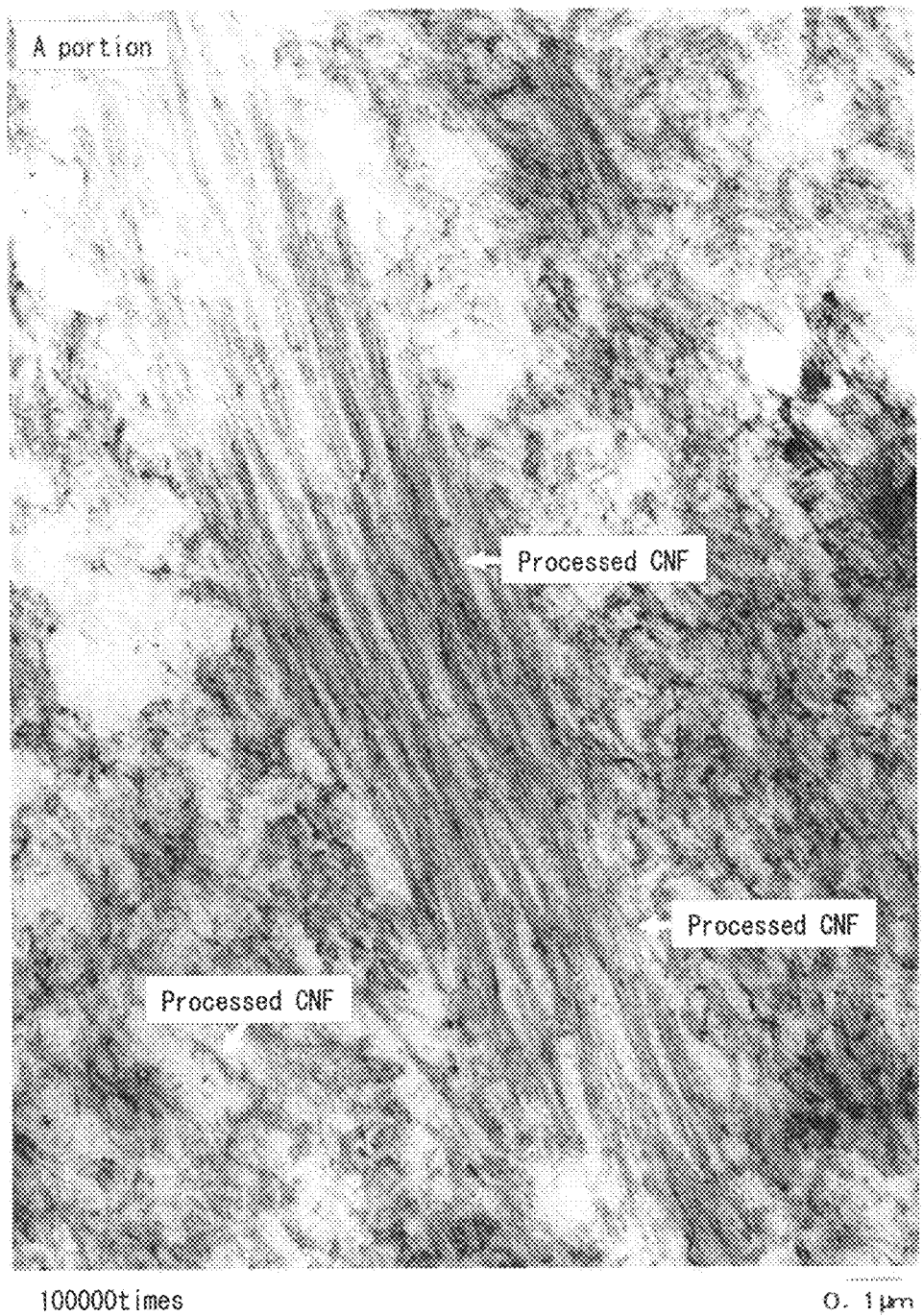
FIG. 9 is a transmission electron micrograph (TEM) showing the distance between the fibers in the cellulose nanofibers after the treatment in an example of the present invention.

FIG. 8 is a transmission electron micrograph (TEM) showing the distance between the fibers in the cellulose nanofibers before the treatment. FIG. 9 is a transmission electron micrograph (TEM) showing the distance between the fibers in the cellulose nanofibers after the treatment of the present invention. The treatment of the present invention increased the distance between the fibers from 1 nm (FIG. 8) to 10 nm (FIG. 9). Thus, the present invention can reduce the Van der Waals force between the fibers (i.e., the force of attraction between the fibers) to one millionth of that of the cellulose nanofibers before the treatment, which is a surprising finding.

Example 3, Comparative Examples 1 to 5

Experiments were performed to study the substrate sheet. The selection of the substrate sheet is important for the following reasons.

(1) Substrate Sheet with Good Wettability for Application of CNF Dispersion

If the CNF dispersion does not easily spread on the substrate sheet, the chemical modification does not proceed uniformly. This can cause an aggregation of the cellulose nanofibers. Therefore, the use of the substrate sheet having good wettability is preferred because the cellulose nanofibers are uniformly applied over the surface.

(2) Substrate Sheet with Resistance to Deformation During Processing

In some cases, the substrate sheet is deformed by a hydrophobic treatment of the cellulose nanofibers. Such a deformation of the substrate sheet may result in a heterogeneous graft polymerization reaction, or cause the cellulose nanofibers to react with the substrate sheet. Therefore, the substrate sheet should not be deformed before and after the processing.

(3) Substrate Sheet with Releasability to Facilitate Removal of Cellulose Nanofibers after Processing If the cellulose nanofibers are bonded to the substrate sheet, the processing will be difficult. Therefore, it is preferable that the substrate sheet allows the easy removal of the cellulose nanofibers after the processing.

In view of the above, experiments were performed using substrate sheets shown in Table 2. The experimental conditions were the same as those in Example 1 except that the raw cellulose nanofibers dispersed in water and applied to the substrate sheet was dried at 100° C. for 30 minutes. The evaluation criteria are as follows. Table 2 shows the results.

<Wettability for Application of CNF>
A: 90% or more of the substrate sheet was wet.
B: 50% or more and less than 90% of the substrate sheet was wet.
C: Less than 50% of the substrate sheet was wet.

<Deformation of Substrate Sheet During Processing (i.e., Drying and EB Irradiation after Application of CNF)>
A: The substrate sheet was not deformed.
B: The substrate sheet was observed to be deformed to some extent.
C: The substrate sheet was significantly deformed.

<Releasability for CNF after Processing>
A: The cellulose nanofibers were easily removed.
B: The cellulose nanofibers were not easily removed somewhat.
C: The cellulose nanofibers were not easily removed.

TABLE 2

|  | Substrate sheet | Wettability | Deformation | Releasability | Causes of deformation | Melting point (° C.) | G value |
|---|---|---|---|---|---|---|---|
| Example 3 | PET | B | A | A | — | 255-260 | 0.02-0.03 |
| Comparative Example 1 | Vinyl chloride | B | C | A | Heat generated during drying | 60-80 | 8 |
| Comparative Example 2 | Cellophane | A | B | C | Moisture absorption in coating process | Decomposition temperature: about 200 | 3.3-6.8 |
| Comparative Example 3 | EVA | B | C | B | Heat generated during drying and shrinkage by EB irradiation | 90-150 | Unknown |
| Comparative Example 4 | PE | C | B | A | Heat generated during drying and shrinkage by EB irradiation | LD: 70-90 HD: 90-110 | 2.9-4.5 |

TABLE 2-continued

| | Substrate sheet | Wettability | Deformation | Releasability | Causes of deformation | Melting point (° C.) | G value |
|---|---|---|---|---|---|---|---|
| Comparative Example 5 | PP | C | A | A | — | 168 | 3.3 |

(Note)
EVA, PE, and PP stand for ethylene-vinyl acetate copolymer, polyethylene, and polypropylene, respectively.
The G value is the number of molecules that are decomposed or bound with an energy of 100 eV (literature value).

As is evident from Table 2, the most superior material for the substrate sheet was polyethylene terephthalate.

INDUSTRIAL APPLICABILITY

The cellulose nanofiber powder of the present invention is fine and transparent when mixed with other substances, and is useful for a resin reinforcing material, an additive to various coating materials, or the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing a cellulose nanofiber powder comprising:
    applying raw cellulose nanofibers dispersed in a solvent to a surface of a substrate sheet having wettability with respect to the solvent;
    irradiating the substrate sheet coated with the raw cellulose nanofibers with an electron beam when the raw cellulose nanofibers are wet or after the raw cellulose nanofibers are dried, and bringing the raw cellulose nanofibers into contact with a solution or dispersion containing a hydrophobic monomer so that the hydrophobic monomer is graft-polymerized onto the raw cellulose nanofibers, or mixing the raw cellulose nanofibers dispersed in the solvent with a hydrophobic monomer, applying the mixture to the surface of the substrate sheet, and irradiating the substrate sheet coated with the mixture with an electron beam so that the hydrophobic monomer is graft-polymerized onto the raw cellulose nanofibers;
    removing a graft-polymerized coating from the substrate sheet as a recovered material;
    washing an unreacted material from the recovered material; and
    drying the recovered material,
    wherein a hydrophobic polymer is chemically bonded to at least some of OH groups of cellulose nanofibers of the cellulose nanofiber powder, and
    the cellulose nanofiber powder has an ability to be dispersed in water and to return to a powder form again when an aqueous dispersion of the cellulose nanofiber powder is dried.

2. The method for producing the cellulose nanofiber powder according to claim 1, wherein the substrate sheet having wettability is a polyester film.

3. The method for producing the cellulose nanofiber powder according to claim 1, wherein in the application process, the raw cellulose nanofibers dispersed in the solvent are applied so that a thickness of the raw cellulose nanofibers in a wet state is 0.01 to 20 mm.

4. The method for producing the cellulose nanofiber powder according to claim 1, wherein the raw cellulose nanofibers irradiated with the electron beam are brought into contact with the solution or dispersion containing a hydrophobic monomer by immersion or spraying.

5. The method for producing the cellulose nanofiber powder according to claim 1, wherein the unreacted material is washed from the recovered material by performing a process of mixing the recovered material with water or ethanol and centrifuging the mixture, and repeating the process multiple times.

6. The method for producing the cellulose nanofiber powder according to claim 1, wherein a distance between fibers in the cellulose nanofiber powder in a dry state is 3 nm or more.

7. The method for producing the cellulose nanofiber powder according to claim 1, wherein the cellulose nanofiber powder does not become viscous when mixed with water.

8. The method for producing the cellulose nanofiber powder according to claim 1, wherein the hydrophobic polymer is formed by graft polymerization of a hydrophobic monomer including an unsaturated hydrocarbon radical.

* * * * *